(12) United States Patent
Shrimali et al.

(10) Patent No.: US 7,539,199 B2
(45) Date of Patent: May 26, 2009

(54) SWITCH FABRIC SCHEDULING WITH FAIRNESS AND PRIORITY CONSIDERATION

(76) Inventors: Gireesh Shrimali, 444 San Antonio Rd., #9C, Palo Alto, CA (US) 94306; Shang-Tse Chuang, 800 High School Way, #124, Mountain View, CA (US) 94041

( * ) Notice: Subject to any disclaimer, the term of this patent is extended or adjusted under 35 U.S.C. 154(b) by 960 days.

(21) Appl. No.: 10/614,423

(22) Filed: Jul. 7, 2003

(65) Prior Publication Data
US 2004/0165598 A1 Aug. 26, 2004

Related U.S. Application Data

(60) Provisional application No. 60/449,268, filed on Feb. 21, 2003.

(51) Int. Cl.
*H04L 12/28* (2006.01)
*H04J 3/02* (2006.01)
(52) U.S. Cl. .................. 370/395.42; 370/462
(58) Field of Classification Search ............... 370/419, 370/395.41, 395.42
See application file for complete search history.

(56) References Cited

U.S. PATENT DOCUMENTS

| | | | |
|---|---|---|---|
| 5,734,649 A | 3/1998 | Carvey et al. | |
| 6,731,636 B1 * | 5/2004 | Ikematsu | 370/395.1 |
| 6,735,212 B1 * | 5/2004 | Calamvokis | 370/412 |
| 7,061,867 B2 * | 6/2006 | Huang et al. | 370/235 |
| 7,324,452 B2 * | 1/2008 | Xu et al. | 370/236 |
| 7,346,068 B1 * | 3/2008 | Dan et al. | 370/413 |
| 7,373,420 B1 * | 5/2008 | Lyon | 709/235 |
| 2001/0021191 A1 * | 9/2001 | Isoyama et al. | 370/392 |
| 2003/0227926 A1 * | 12/2003 | Ramamurthy et al. | 370/395.42 |
| 2003/0227932 A1 * | 12/2003 | Meempat et al. | 370/415 |
| 2004/0085967 A1 * | 5/2004 | Boduch et al. | 370/395.42 |
| 2004/0120337 A1 * | 6/2004 | Jun et al. | 370/413 |
| 2004/0156376 A1 * | 8/2004 | Nakagawa | 370/412 |

OTHER PUBLICATIONS

Dai & Prabhakar, "The throughput of data switches with and without speedup".
Benett & Zhang, "Hierarchical Packet Fair Queueing Algorithms".
Zhang, Towsley & Kurose, "Statistical Analysis of the Generalized Processor Sharing Scheduling Discipline".
Shreedhar & Varghese, "Efficient Fair Queuing using Deficit Round Robin", Nov. 18, 1994.
Chi & Tamir, "Decomposed Arbiters for Large Crossbars with Multi-Queue Input Buffers", Proceedings of the International Conference on Computer Design, Cambridge, MA, pp. 233-238, Oct. 1991.

* cited by examiner

*Primary Examiner*—Gregory B Sefcheck
*Assistant Examiner*—Suk Jin Kang
(74) *Attorney, Agent, or Firm*—Vierra Magen Marcus & DeNiro LLP

(57) ABSTRACT

A scheduler for a packet switch in a high-speed network. In various embodiments, switch throughput and fairness is improved by operating on request data before arbitration. Other embodiments further include forms of weighted round robin ("WRR") allocation of output bandwidth prior to arbitration. In various embodiments, the WRR allocation is performed at more than one level. For example, an output applies WRR allocation to all inputs requesting access to that output. In addition, an input applies WRR allocation to multiple classes of data on that input.

27 Claims, 12 Drawing Sheets

| Row or Col Position | 0 1 2 | 0 1 2 | 0 1 2 | 0 1 2 |
|---|---|---|---|---|
| Calculated Shuffle Control | 1 2 0 | 0 2 1 | 2 1 0 | 1 0 2 |
| Row Shuffle | 1 2 0 | 0 2 1 | 2 1 0 | 1 0 2 |
| Col Shuffle | 1 2 0 | 1 2 0 | 2 1 0 | 2 0 1 |
| Cell Time | 0 | 1 | 2 | 3 |

| Row or Col Position | 0 1 2 | 0 1 2 | 0 1 2 | 0 1 2 |
|---|---|---|---|---|
| Calculated Shuffle Control | 1 2 0 | 0 2 1 | 2 1 0 | 1 0 2 |
| Row Shuffle | 1 2 0 | 1 2 0 | 2 1 0 | 2 0 1 |
| Col Shuffle | 1 2 0 | 0 2 1 | 2 1 0 | 1 0 2 |
| Cell Time | 0 | 1 | 2 | 3 |

FIG. 11
FIG. 12
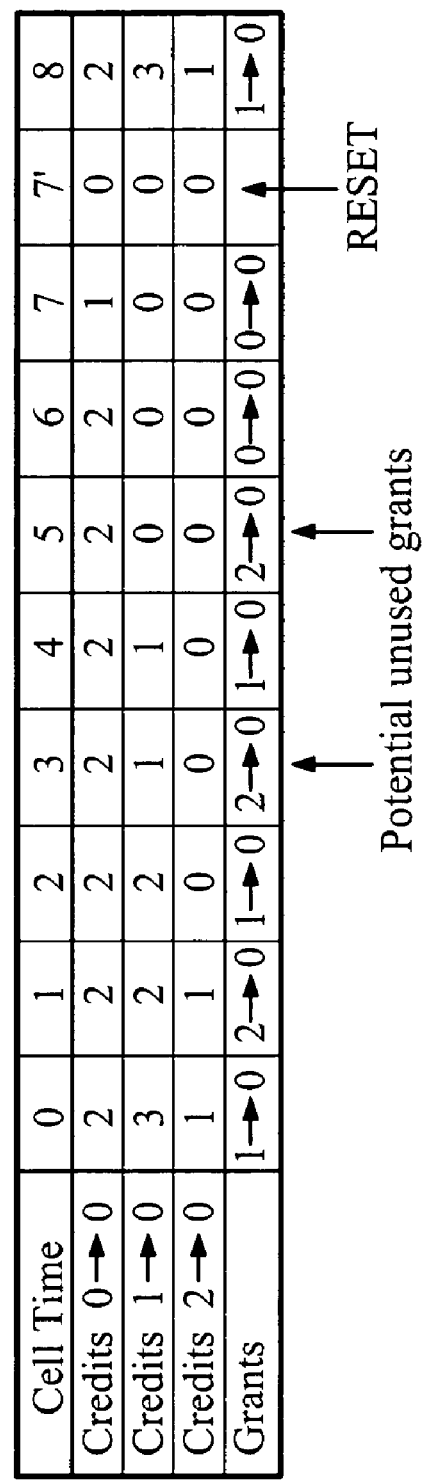
FIG. 13

SWITCH FABRIC SCHEDULING WITH FAIRNESS AND PRIORITY CONSIDERATION

PRIORITY CLAIM

The present application claims priority to U.S. Provisional Patent Application Ser. No. 60/449,268, filed on Feb. 21, 2003, entitled, "SWITCH FABRIC SCHEDULING WITH FAIRNESS AND PRIORITY CONSIDERATION."

FIELD OF THE INVENTION

The present invention relates to scheduling data through packet switches in high-speed data networks.

BACKGROUND

In high-speed packet data networks, data traffic is handled by switches that receive data at multiple inputs and transmit data at multiple outputs. Particular outputs typically correspond to particular destinations or routes to destinations. Many switch fabric designs have been developed to deal with a series of challenges such as, higher port counts, faster speeds, and greater attention to individual traffic flows. Switch fabrics are used in many applications, including Internet routers, packet data networks, and storage-area-networks. The requirements and goals of different applications are similar. A packet switch in a packet data network will be used as an example of prior data switches.

Data packets arrive at an input of the packet switch with a request to be transmitted to a particular output of the packet switch. Several challenges are presented to those who design packet switches for increasingly high data rate systems. One challenge is providing sufficient switch throughput given very high data rates. Another challenge is providing some fairness among packets or inputs competing for particular outputs so that each packet or input gets an adequate opportunity to access a requested output. Yet another challenge in some cases is providing weighted fairness so that data considered to have relatively higher priority is given preferential access to requested outputs. The latter two challenges relate to quality of service ("QoS"). QoS refers to performance properties of a network service, possibly including throughput, transit delay, and priority. Some protocols allow packets or data streams to include QoS requirements.

Packet switches typically include a scheduler, or arbiter, that decides which requests for outputs are granted. The terms "scheduler" and "arbiter" will be used interchangeably herein. One prior type of packet switch, referred to as an output queued switch, is illustrated in FIG. 1. Output queued switch 100 includes multiple inputs 102, multiple outputs 106, and multiple output queues 108. Since each output queue can receive all the incoming data, there is no need for a centralized scheduler. More than one input may have data requesting the same output at one time. For example, in FIG. 1, all inputs 102A-102D are requesting output 106A. To compensate for this, the output queued switch queues the data at the outputs 106 in output queues 108 In an attempt to achieve fairness, algorithms such as weighted fair queuing ("WFQ") or weighted round robin ("WRR") are applied to the data at the outputs. Although acceptable results are achieved with output queued switches and fairness algorithms in prior smaller systems, these methods do not scale to today's larger systems.

Another class of packet switch is known as an input queued switch with virtual output queues (VOQs). Input queued switches queue data at each input, and do not queue data at the outputs. VOQs are arranged such that each input holds data in a separate queue per output. FIG. 2 is a block diagram of a prior input queued switch 200. Switch 200 includes multiple inputs 202 multiple input queues 204, arbiter 206, crossbar 208, and multiple outputs 210. The crossbar 208 includes one input connection 212 for each switch input and one output connection 214 each switch output 210. The crossbar 208 is configured so that it can physically connect data signals on any the switch inputs 202 to any the switch outputs 210. The number of inputs and outputs may or may not be the same. In a common example, data is segmented into fixed-length cells before being switched. A cell is usually transferred from a switch input to a switch output in one unit time called a cell time. Once each cell time, the arbiter 206 configures the crossbar to make certain input-to-output connections for that cell time. Data traffic often has the characteristic that any inputs can request any outputs at any time. Therefore, multiple inputs may request the same output in the same cell time. The arbiter 206 receives requests for outputs 210 from the input queues 204 and applies an algorithm to determine the configuration of the crossbar 208 each cell time. Usually, a key goal in designing an arbiter for the switch 200 is to achieve a throughput rate of as close to 100% as possible. 100% throughput means that none of the input queues 204 are unstable for non-oversubscribed traffic. Non-oversubscribed traffic is traffic where no input 202 or output 210 receives more than its line rate.

Various algorithms have been developed for arbiter 206 to provide fairness and achieve good throughput. These algorithms include maximum weight matching, maximum size matching, and maximal size matching. "Weight" is an arbitrary assignment of relative priority for a particular data cell. Weight is assigned independently of the packet switching process. Maximum weight matching tries to maximize the instantaneous total weight of a matching by looking at the weights assigned to various input queues. It has been shown to achieve 100% throughput. Maximum size matching merely attempts to make the most number of connections each cell time. Both of these algorithms have proven to be impractical because they are computationally expensive and slow.

One way to address the throughput issue is to run the arbiter at some multiple of the system speed. This is referred to as "speed up", such as speed up of 1.5 (in which the arbiter, or scheduler, operates at 1.5 times the linerate), or speed up of (in which the arbiter, or scheduler, operates at twice the linerate). This alternative has its own disadvantages, such as additional power consumption. Another limitation of speed up is that the switch may achieve 100% throughput, but a bottleneck simply occurs somewhere else in the system, such as at the traffic manager.

Maximal size matching is easier to implement and can yield acceptable results with minimal speed up. Maximal size algorithms include wavefront arbitration ("WFA") and wrapped wavefront arbitration ("WWFA"). Such algorithms are discussed in more detail in by Hsin-Chou Chi and Yuval Tamir (Proceedings of the International Conference on Computer Design, Cambridge Mass., pp. 233-238, October, 1991). These arbiters receive and operate on data in the form of a request matrix array. The request matrix represents requests from respective inputs for respective outputs. Both WFA and WWFA arbiters have the disadvantage of being unfair. By their nature, these arbiters consider requests from certain inputs ahead of others in sequence a disproportionate amount of the time. Also, these arbiters grant requests for outputs only once. Thus, inputs whose requests are usually considered later in sequence face a greater likelihood of having their requests refused because a requested output is already assigned. Attempts to improve on the degree of fairness provided by WFA and WWFA have been made. For example, the request matrix is rearranged before being operated on by the arbiter. Conventional methods of matrix rearrangement, such as those described by Hsin-Chou Chi and Yuval Tamir, increase fairness somewhat. However, a significant disadvantage of these schemes is their poor throughput performance under certain benign traffic patterns.

Notice that the existing methods have focused primarily on dividing output port bandwidth equally among contending inputs. However, the increased focus on providing quality of service guarantees requires dividing the output port bandwidth to contending inputs in a weighted fair manner. For example, an output might want to divide its link bandwidth where one input receives ⅔ of the bandwidth and a second input receives ⅓ of the bandwidth.

Thus, there is a need for a switch fabric with a scheduler that (1) achieves good throughput and (2) provides improved quality of service.

BRIEF DESCRIPTION OF THE DRAWINGS

The present invention is illustrated by way example, and not by way of limitation, in the figures of the accompanying drawings in which:

FIG. 11 is a diagram of a request matrix;

FIG. 12 is a diagram of initial weights assigned data paths; and

FIG. 13 is a diagram illustrating an embodiment for determining which requests of FIG. 11 are passed to a scheduler according to the weights of FIG. 12;

DETAILED DESCRIPTION

A switch fabric in a high-speed network is described. In various embodiments, switch throughput and fairness is improved by altering the request data priority before arbitration. One embodiment is used to provide equal share of the output bandwidth while maintaining good throughput.

Another embodiment includes forms of weighted round robin ("WRR") allocation of output bandwidth. In various embodiments related to WRR allocation, the allocation can be performed at more than one level. For example, an output applies WRR allocation to all inputs requesting access to that output. In addition, an input applies WRR allocation to multiple classes or priorities of data on that input. The described forms of WRR allocation can be applied on top of existing strict priority scheduling, but are not so limited. Embodiments of the invention are described with reference to an input queued switch with VOQs. The embodiments described are also applicable to other types of switches, such as input queued and output queued switches.

Figure 1:
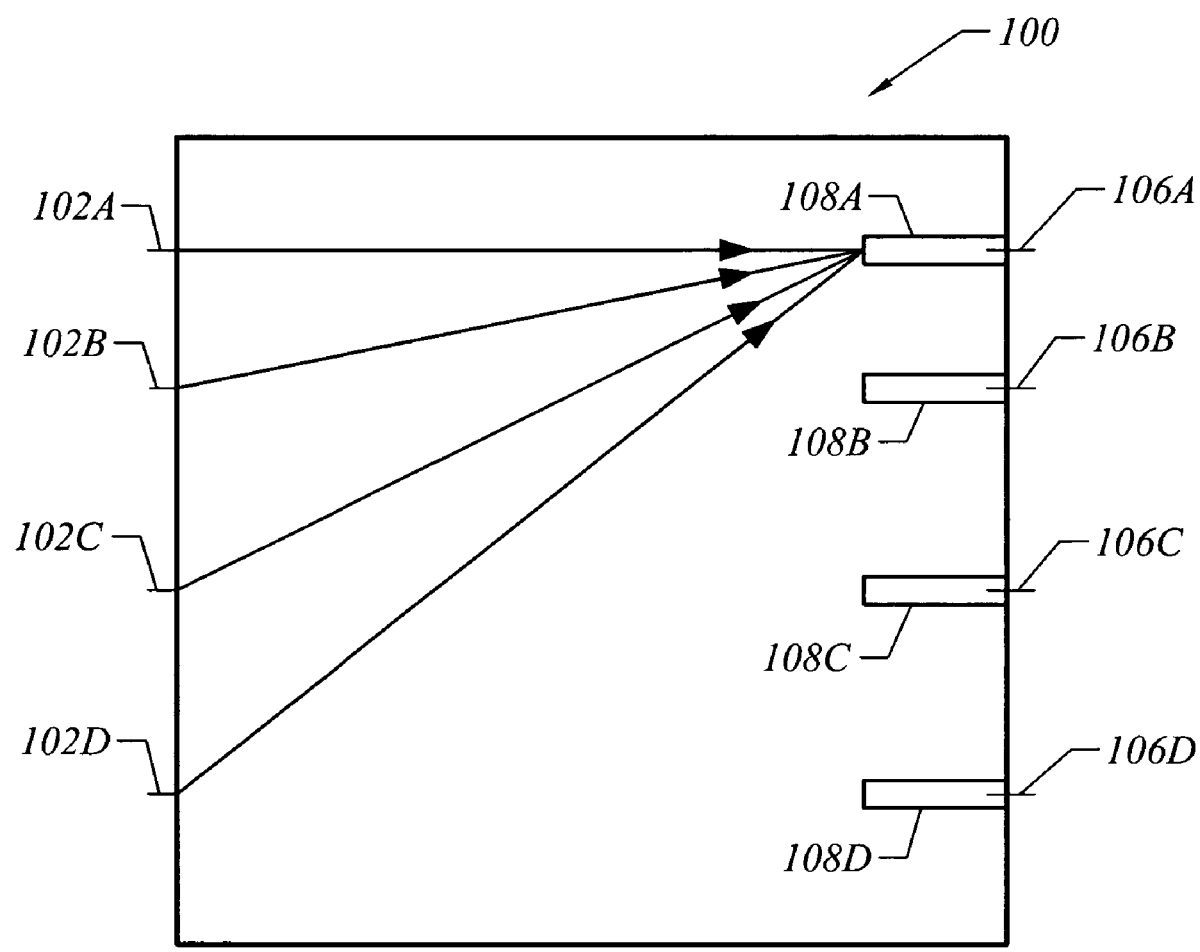
FIG. 1 is a block diagram of a prior art data switch.
Figure 2:
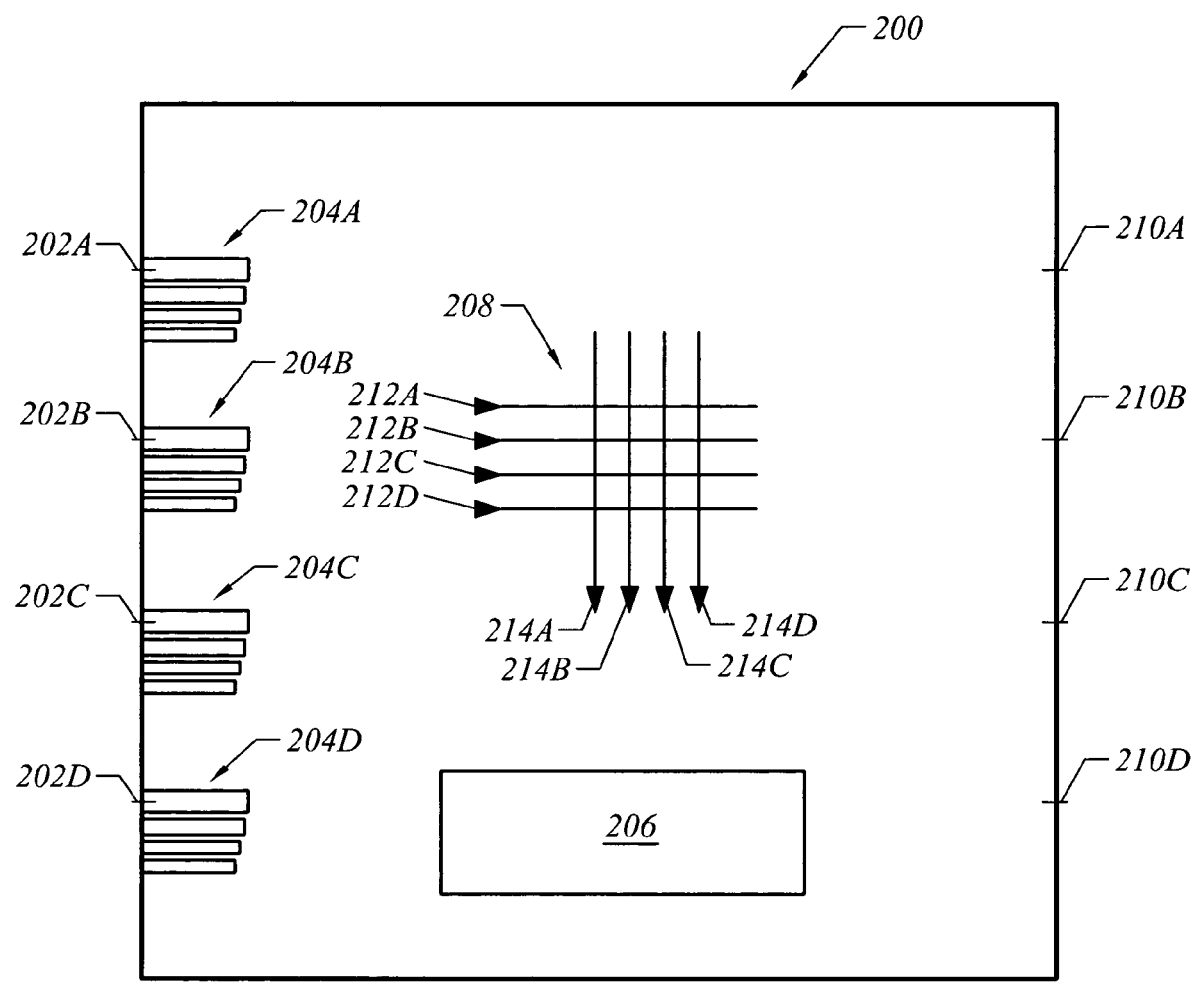
FIG. 2 is a block diagram of a prior art data switch.
Figure 3:
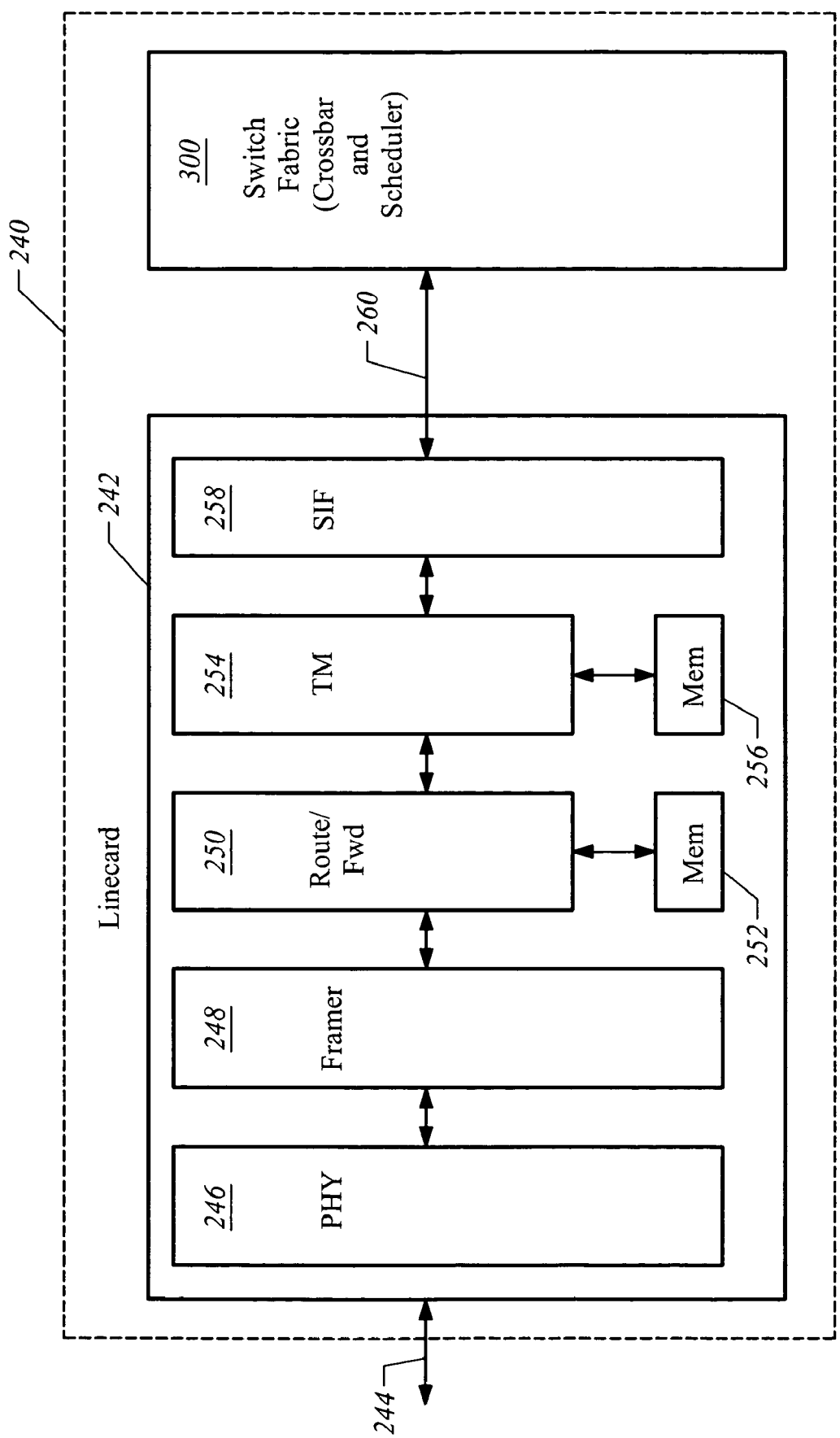
FIG. 3 is a block diagram of an embodiment a packet switch.

Embodiments of the invention are described with reference to a particular maximal size match arbiter known as a wrapped wavefront arbiter. Other maximal size match arbiters, or other types of arbiters, could also be used. Embodiments are described in the context of a packet switch, but are not so limited. For example, the embodiments are also relevant to Internet routers, storage-area-networks, and any other high-speed data switch application. FIG. 3 is a block diagram of an embodiment of a packet switch 240. The packet switch 240 includes a linecard 242 and a switch fabric 300. The linecard 242 is coupled to a physical medium 244, such as an optical connection. The linecard 242 includes a physical interface 246 that receives data through the physical medium 244, a framer 248, a routing engine 250, a traffic manager 254, and a serial interface 258. The serial interface 258 is coupled to the switch fabric 300 through a serial connection 260. The switch fabric 300 includes a crossbar and crossbar scheduler. The crossbar scheduler will be described in the following section.

Crossbar Scheduler

Figure 4:
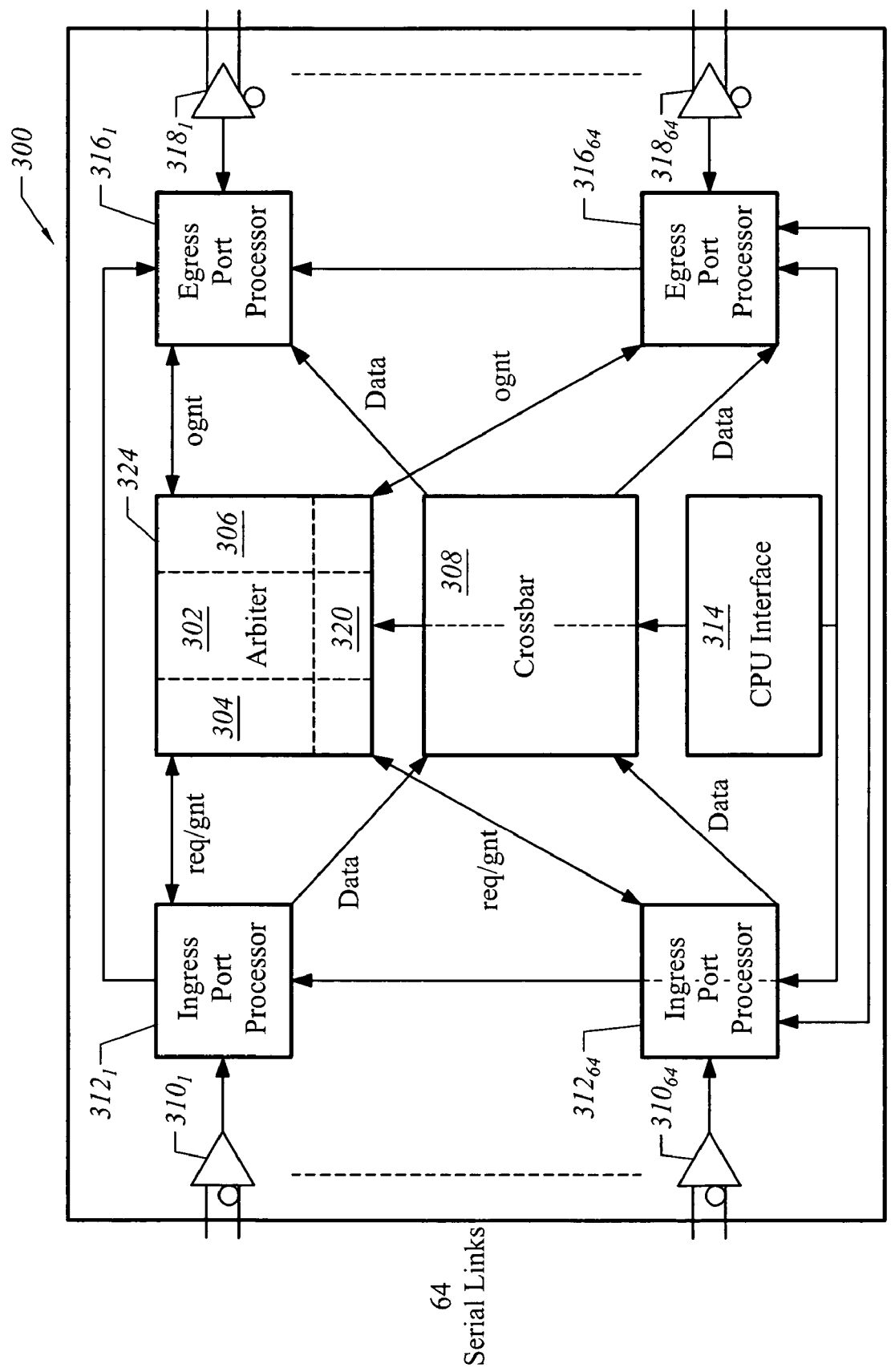
FIG. 4 is a block diagram of an embodiment a crossbar scheduler.

FIG. 4 is a block diagram of an embodiment of a crossbar scheduler 300. The crossbar scheduler 300 is a component of a packet switch in a high-speed data network, and is but one example of a component in which the invention is used. The crossbar scheduler 300 includes 64 input ports, $310_1$-$310_{64}$ (also referred to as ingress ports) that couple the switch 300 to 64 serial links. In other embodiments, the crossbar scheduler could be smaller or large, for example, the crossbar scheduler could have 32 serial links or 128 serial links. Similarly, the crossbar scheduler 300 has 64 output ports, $318_1$-$318_{64}$, also referred to as egress ports. The embodiment uses differential signaling and thus two wires are shown for each of the serial links entering and exiting the switch 300. The crossbar scheduler 300 further includes an ingress port processor 312 for each ingress port 310, and an egress port processor 316 for each egress port 318. The ingress port processors 312 and the egress port processors 316 each provide an interface to the network, handling data queuing and other issues. The ingress processor 312 will be further described below.

Ingress port processors 312 are coupled to a scheduler 324, a crossbar 308, and a central processing unit ("CPU") 314. Components of the scheduler 324 include a shuffle component 304, an arbiter 302, and a de-shuffle component 306. The components of the scheduler 324 will be discussed with reference to FIG. 5. The egress port processors 316 are similarly coupled to the scheduler 324, the crossbar 308, and the CPU 314. Data arrives via the serial links 310 and enters respective ingress port processors 312. In one embodiment, the data is grouped into units called cells. The data could have various characteristics depending on the network protocol used. For example, the cells could arrive having been assigned different priorities that determine how quickly they should be transferred from an ingress port to an egress port with respect other cells with lower priorities. For example, one protocol uses 8 different priorities, 0-7, with 0 being the highest priority and 7 being the lowest priority. In one embodiment, the protocol is a strict priority scheme, meaning that a cell with a priority N will always be lower priority than a cell with a priority N−1.

As further detailed below, embodiments the invention are useable with a strict priority scheme.

The data arriving at the ingress ports 310 may also have been assigned various classes. The class the data may have any consequences desired by the protocol. Classes usually have some relationship to priorities, for example, all data the same class usually has the same priority. In strict priority systems several classes can be mapped to one priority. Cells that arrive at an ingress port 310 must be transferred to an egress port 318. Typically, a cell includes some routing information that is interpreted by the ingress port processor 312 as a request for a particular egress port 318 at a particular class or priority. In one embodiment, the ingress port processor 312 queues the cells at its corresponding ingress port 310 in virtual output queues. Virtual output queues will also be referred to as ingress queues herein. That is, the ingress port processor 312 maintains a queue for each combination egress port 318 and class or priority. In one embodiment, the ingress port processor 312 sends requests to the scheduler 324, where a request is made by one ingress queue to transfer a cell to one egress port. The scheduler receives requests from each ingress port processor 312 and determines, as will be detailed below, which requests to grant. When the determination is made, the scheduler 324 sends grant signals to the appropriate ingress port processors 312, and the crossbar is configured to perform a transfer of cells ingress ports 310 to egress ports 318. In one embodiment, the configuration of the crossbar is done once per cell time. In other embodiments, speed up is used and the configuration of the crossbar is done more than once per cell time. One advantage of the embodiments described is improved performance without speed up.

Figure 5:
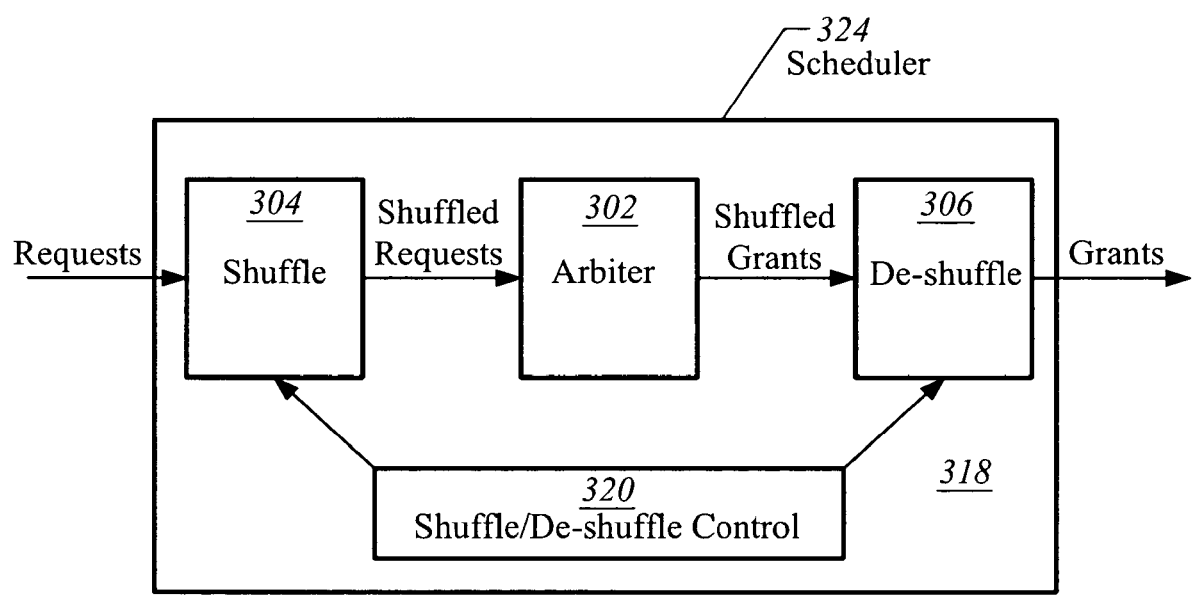
FIG. 5 is a block diagram of an embodiment a scheduler.

Embodiments of a scheduler 324 will now be described. In one embodiment, the scheduler 324 received instruction and data from the CPU interface 314. A block diagram of an embodiment of the scheduler 324 is shown in FIG. 5. The scheduler 324 includes arbiter 302, shuffle component 304, and de-shuffle component 306. The shuffle/de-shuffle control 320 conveys control signals from the CPU interface 314 to the shuffle component 304, and de-shuffle component 306. Requests enter the shuffle component 304 in the form of a request matrix. The request matrix indicates which inputs are requesting which outputs. The term "inputs" is used generically, and could refer to one ingress port or to one of several data queues belonging to one ingress port, depending on a specific implementation. In the embodiments described, each ingress port has multiple data queues, each of which may request an egress port. The shuffle component 304 rearranges a request matrix before arbitration is performed on the matrix by the arbiter 302. As will be explained in detail below, the rearrangement improves the throughput and fairness of conventional arbiters. In one embodiment, the arbiter 302 uses a maximal size matching algorithm, such as wrapped wavefront arbitration ("WWFA"), but other algorithms also benefit from the embodiments. The arbiter 302 determines which requests will be granted and outputs a shuffled grant matrix. A de-shuffle component 306 operates on the shuffled grant matrix to produce a grant matrix which is used to configure the crossbar. The de-shuffle operation restores the shuffled request matrix elements to their original positions which accurately indicate respective input and output pairs for the request matrix.

Figure 6:
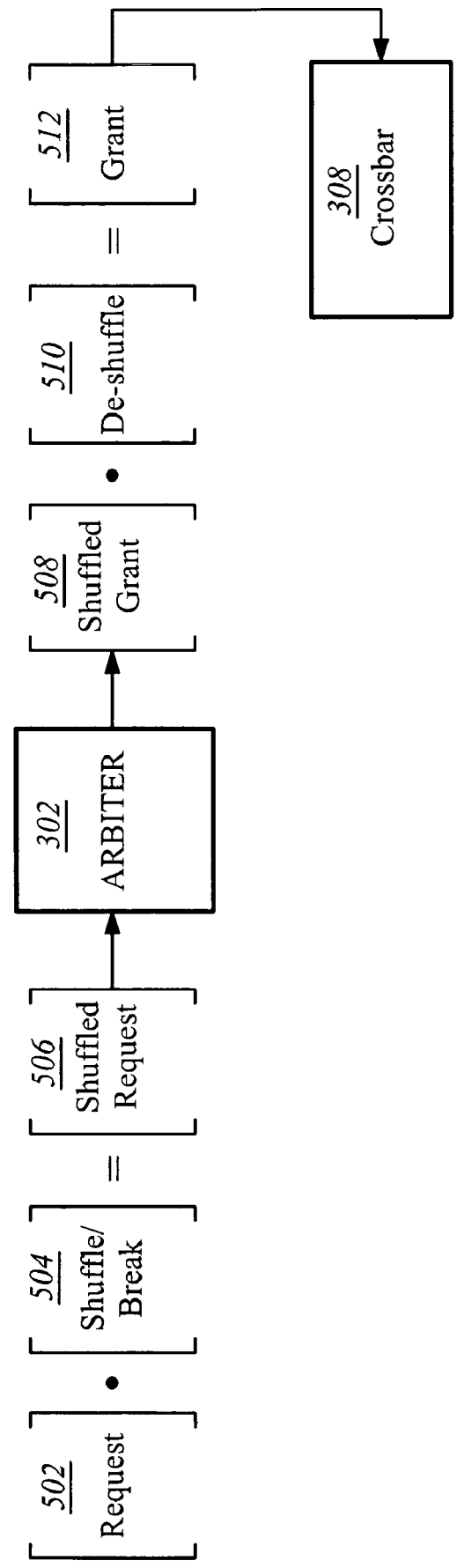
FIG. 6 is a diagram illustrating an embodiment of a scheduling process.

FIG. 6 is an illustration of the operation of the scheduler 324. The request matrix 502 is transformed as to rearrange rows and columns to produce a shuffled request matrix 506. The rearrangement will be described in more detail. The operation is represented here as a transformation where the request matrix is rearranged by a shuffle matrix 504. The arbiter produces the shuffled grant matrix 508, which is rearranged by a de-shuffle matrix 510 to produce the grant matrix 512 which is used to configure the crossbar 308. The shuffle operation probabilistically increases the number of grants the arbiter allows and thus increases throughput with a conventional algorithm. In addition, there is increased fairness among inputs requesting outputs.

Figures 7, 8:
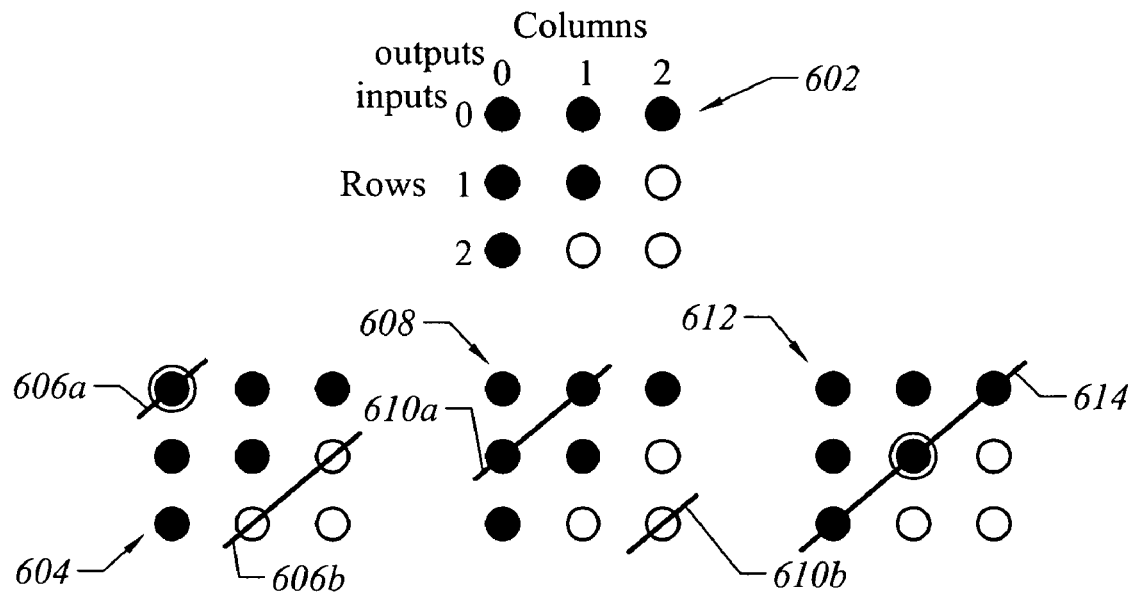
FIG. 7 is a diagram illustrating a type of arbitration.
FIG. 8 is a diagram illustrating an embodiment a request matrix shuffling operation.

FIG. 7 illustrates wrapped wavefront arbitration ("WWFA"). WWFA is the algorithm executed by the arbiter 302 in one embodiment. WWFA has a linear complexity that is desirable for hardware implementation. With N inputs, N and up to $N^2$ requests, it computes a maximal match in 0(N) time. Request matrix 602 is a simplified example of a request matrix with 3 inputs and 3 outputs. The inputs are represented by rows 0, 1, and 2, and the outputs are represented by columns 0, 1, and 2. The darkened circles represent pending requests. For example, the darkened circle at position 0,0 is a request from input 0 for output O.

Matrix 604 illustrates one of three stages of WWFA. The matrix diagonals 606 are considered. Diagonal 606a includes the 0, 0 element. There is a pending request for the 0,0 path or flow, and it is granted. The grant is indicated by the circle around the darkened inner circle. Because one input can be connected to one at one time in the crossbar, input 0 and output 0 are now unavailable. This can be visualized by removing row 0 and column 0 from consideration. Diagonal 606b is also considered at the same time as diagonal 606a because the two 606 diagonals do not interfere with another. Notice that diagonal 606b does not contain elements in row 0 or column 0. There are no pending requests in diagonal 606b, so the only grant from the first stage matrix 604 is the 0,0 grant.

Matrix 608 illustrates the second stage of WWFA. Two new diagonals that do not interfere with each other are considered in this stage. They are the diagonals 610a, and 610b. There are two requests on the diagonal 610a, but there can be no grants because input 0 and output 0 are not free. Additionally, there are no requests on the diagonal 610b.

Matrix 612 illustrates the final stage of WWFA. One diagonal, diagonal 614, is left to be considered. There are three pending requests, but only the 1, 1 request is granted because the other requests involve "taken" input 0 and the "taken" output O.

If the request matrix remains the same for each arbitration, the requests on diagonal 0 (diagonal 606a in FIG. 7) are always granted and requests on diagonal 1 (diagonal 610a in FIG. 7) are never granted. This usually leads to starvation of flows on diagonal 1 while the flows on diagonal 0 get an unfair share of output bandwidth. One embodiment rearranges the request matrix before each arbitration to improve the fairness, and also the throughput, of WWFA. In one embodiment, an arbitration occurs each cell.

FIG. 8 illustrates the operation of one embodiment of the shuffle component 304. Consider a 3×3 matrix with rows 0, 1, 2, and columns 0, 1,2. Each cell time, a shuffle control value is generated. The shuffle control value is generated in various ways. For example, software using a random_permute function generates the shuffle control values and loads them into a random access memory ("RAM"). The shuffle/de-shuffle control 320 accesses the shuffle control values via the CPU interface 314 and sends them to the shuffle component 304 and the de-shuffle component 306. In one embodiment, the shuffle control values are accessed in rotation. There are trade-offs between the size of the RAM and the performance of the scheduler 324. As the number of RAM entries, or different permutations of row and column positions, approaches N! (for an N×N matrix), the performance of the scheduler 324 approaches the ideal case. In the ideal case, the scheduler behaves as if the shuffle controls were generated in real time. However, the size of the RAM increases with the number of permutations, which is usually undesirable. The shuffle control values can also be hardware generated. For example, pseudo-random shuffle control values can be generated by pseudo-random number generators, such as counters, that add mutually prime values over time. The shuffle control values can also be hardware generated deterministically using a carefully generated sequence that insures long-term and short-term fairness.

Referring to FIG. 8, the top row of the table indicates the original position of a row column. In the following discussion, the rows and columns will be referred to by their original positions, such as row 0, row 1 and row 2. The calculated shuffle control is the shuffle control value generated for a cell time. Looking at cell time 0, the shuffle control value is 1, 2, 0. In cell time 0, both the rows and the columns are rearranged, or shuffled according to the shuffle control value. Specifically, row 1 takes position 0, row 2 takes position 1, and row 0 takes position 2. Also in cell time 0, the columns are rearranged in the same way, according to the shuffle control value. In cell time 1, a new shuffle control value is generated, and the rows are shuffled according to the new value, as before. The columns, however, are shuffled according to a reversed shuffle control. The shuffle control for cell time 1 is 0, 2, 1. The rows are rearranged according to 0, 2, 1. The columns are rearranged according to 1, 2, 0. Every other cell time (cell times 0 and 2 in the figure), the rows and the columns are each shuffled according to the shuffle control value. In alternate cell times (cell times 1 and 3 in the figure), the rows are shuffled according to the shuffle control value and the columns are shuffled according to the reversed shuffle control value. Realize that both rows and columns can be shuffled using the same control values. The use of the reverse shuffle control in alternate cell times ensures fairness and good throughput.

Figures 9, 10:
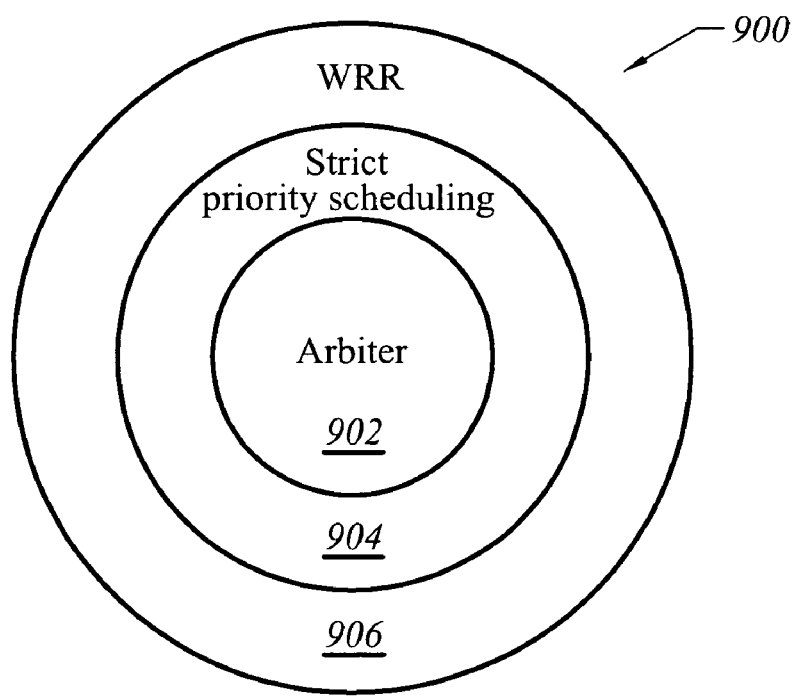
FIG. 9 is a diagram illustrating an embodiment of a request matrix shuffling operation.
FIG. 10 is a diagram of an embodiment layered scheduling.

FIG. 9 illustrates the operation of another embodiment of the shuffle component 304. This operation is similar to the operation explained with reference to FIG. 8. However, there is a difference in that in alternate cells times (cell times 1 and 3 in the figure), the rows, rather than the columns, are shuffled according to the reversed shuffle control value.

Weighted Fair Share Allocation of Egress Port Bandwidth

Embodiments of the invention also include apparatus and methods for improving weighted fair share allocation of egress port bandwidth, which will now be discussed. The embodiments further improve on the fairness provided by crossbar scheduling algorithms. For example, some crossbar scheduling algorithms give weights between input-output pairs, but most are statistical and can result in inaccurate fair share for simple, non-uniform traffic patterns. Embodiments described below use existing strict priority schemes to give an accurate fair share of bandwidth with minimal loss of throughput. The embodiments described below do not depend on a specific scheduling algorithm, but can be applied with any algorithms, such as WWFA, iSLIP, etc. A weighted fair share of egress port bandwidth can be provided at a granularity (or smaller) of an input-output pair.

Two embodiments of weighted fair share allocation will be described. One embodiment is referred to as non-work conserving weighted round robin ("WRR") allocation. The other embodiment is referred to as work conserving WRR allocation. Both of the embodiments can be used with a strict priority scheduling scheme. Both embodiments use a credit based approach, which will be explained in more detail. FIG. 10 is a diagram of an exemplary scheduling arrangement 900 in a switch. An arbiter 902 is the scheduling core, or the innermost layer. Examples include (but are not limited to) WWFA with or without shuffling. Strict priority scheduling 904 is a middle layer. Strict priority scheduling 904 depends only on the arbiter 902. WRR is the outermost layer, and depends on strict priority scheduling 904, which in turn depend on the arbiter 902.

The WRR bandwidth allocation embodiments described are applicable at multiple levels in a system. For example, WRR egress port bandwidth allocation can be applied across ingress ports. WRR bandwidth allocation is also applicable across data flows. WRR bandwidth allocation is hierarchical, and can be applied at many levels. For example, in the embodiments described, a data flow is defined as a three tuple including an ingress port, and egress port, and a data class. WRR allocation is applicable at hierarchical levels to ingress ports, egress ports and data classes. Further levels of hierarchy, such as subports and subclasses are also possible. In the embodiments described, WRR bandwidth allocation is applied by hardware and software at an ingress port. WRR bandwidth allocation may also be applied by hardware and software in other network components, such as a traffic manager. For example in a high-speed optical carrier network, 4 lower rate OC-48 subports are multiplexed to produce one higher-rate OC-192 port. Bandwidth can be allocated among the lower rate subports according to the embodiments described.

The embodiments of WRR allocation described are compatible with a switch fabric that supports multiple classes of service as well as strict priority. For example, an exemplary system uses 8 classes of service that are served in a strict priority manner. The classes 0-7 are mapped to priorities 0-7 in a one-to-one manner with class P mapping to priority P. In the strict priority scheme, flows at priority P−1 have priority over flows at priority P. In one embodiment, strict priority scheduling is pipelined. "Current cell time" is self-explanatory, while "scheduling cell time" refers to the cell time that the arbiter has scheduled for, that is, the cell time when the cell is expected to be switched across the crossbar. In one embodiment, all priorities are scheduled in the same cell time. Each priority uses the same arbiter in a pipelined manner within the cell time. Priority 0 always schedules ahead of the other priorities, such that all inputs and outputs are free to be scheduled for priority 0. In the same "current cell time" priority P schedules for a cell time one less than priority P−1 is scheduling for. Priority P can schedule for inputs and outputs that are still free after priority P−1 scheduling in the previous cell time. The scheduling for cell time T takes 8 cell times, one for each priority. This is one strict priority scheme with which embodiment of WRR allocation will be described, but many others are also compatible.

Embodiments of WRR allocation will first be described with reference to examples. FIG. 11 is a diagram of a request matrix 1000. The request matrix 1000 shows pending requests, which can be expressed as requests for paths, or flows from input 0 to output 0, from input 1 to output 0, and from input 2 to output 0. The requested flows will be referred to as 0→0, 1→0, and 2→0. FIG. 12 is a diagram of weight assignments 1100 for the flows 0→0, 1→0, and 2→0. Flow 0→0 has weight "2", flow 1→0 has weight "3", and flow 2→0 has weight "1". This indicates that output 0 has allocated 2/6 of its bandwidth to input 0, 3/6 of its bandwidth to input 1, and 1/6 of its bandwidth to input 2. Ideally then, for every six grants of output 0 to any input, 3 of them will go to input 1, 2 of them will go to input 0, and 1 of them will go to input 2.

FIGS. 11 and 12 will be used for the following examples to illustrate non-work conserving and work conserving WRR.

FIG. 13 is an illustration of a non-work conserving embodiment of WRR allocation. The pending requests and initial bandwidth allocation (assigned weights) for the requested output 0 are as shown in FIGS. 11 and 12. The top row of the table indicates the cell time. The left column of the table indicates the flows 0→0, 1→0, and 2→0 that will be participate in the example. Reading across the rows for each flow, the number of credits each flow has in a particular cell time is shown. At the bottom of the table, actual grants to particular flows in a cell time are shown. In this particular example, only one of the strict priorities, such as priority 0, is used. The priority can be any of the 8 priorities provided it does not clash with priorities used for other services. Any number of participating classes can be mapped to this single priority, provided that none of the class numbers are used for strict priority QoS support. The WRR allocation process described determines which requests can be passed to the arbiter. Once the requests are passed to the arbiter, arbitration determines which requests are granted.

The following explanation assumes that all active flows have pending requests. At cell time 0, assume that the number of credits is the same as the weight number (from FIG. 12) for each flow. Flow 0→0 has weight "2", flow 1→0 has weight "3", and flow 2→0 has weight "1". At cell time 0, there is a grant to the flow 1→0. Because the flow 1→0 received a grant, its credits are decremented by one. At cell time 1, the flow 1→0 shows the decremented credit number of 2. At cell time 1, there is a grant to the flow 2→0, therefore the credits for this flow are decremented from 1 to 0 in cell time 2. The flow 2→0 now has no credits. A flow that has 0 credits will not have a pending request passed to the arbiter. Only flows with non-zero credits can have requests passed to the arbiter. The process continues until all of the flows have 0 credits, at which time the credits for each flow are reassigned at the original levels according to the bandwidth allocation expressed by the weight numbers. This is shown at "cell time" 7' and cell time 8. "Cell time" 7' is not an actual cell time, but shows one of two concurrent changes in credit count that happen in cell time 8. In "cell time" 7', all of the credit counts for the flows shown go to 0. At cell time 8, all flows again receive their original number of credits, and the process continues. This embodiment allows consideration of weighting and can be used with the scheduling embodiments previously described. However, because some requests are not allowed to the scheduling core, the arbiter sometimes has incomplete information about the request matrix, and this could lead to non-work conserving scheduling and decreased throughput. For example, notice in cell times 3 and 5 no grants take place. The flow 2→0 may have had requests which were disallowed from passing to the scheduler because the flow 2→0 had no credits in the previous cell time. When this occurs, throughput is reduced.

The illustration of FIG. 13 shows one possible method for allotting credits, debiting credits, and adding or resetting credits. Many variations are possible. For example, if some flows have credits, but fail to have requests in one or more cell times, their credits can be forced to 0 to prevent possible blocking requests from flows that have 0 credits, yet have requests.

Figure 14:
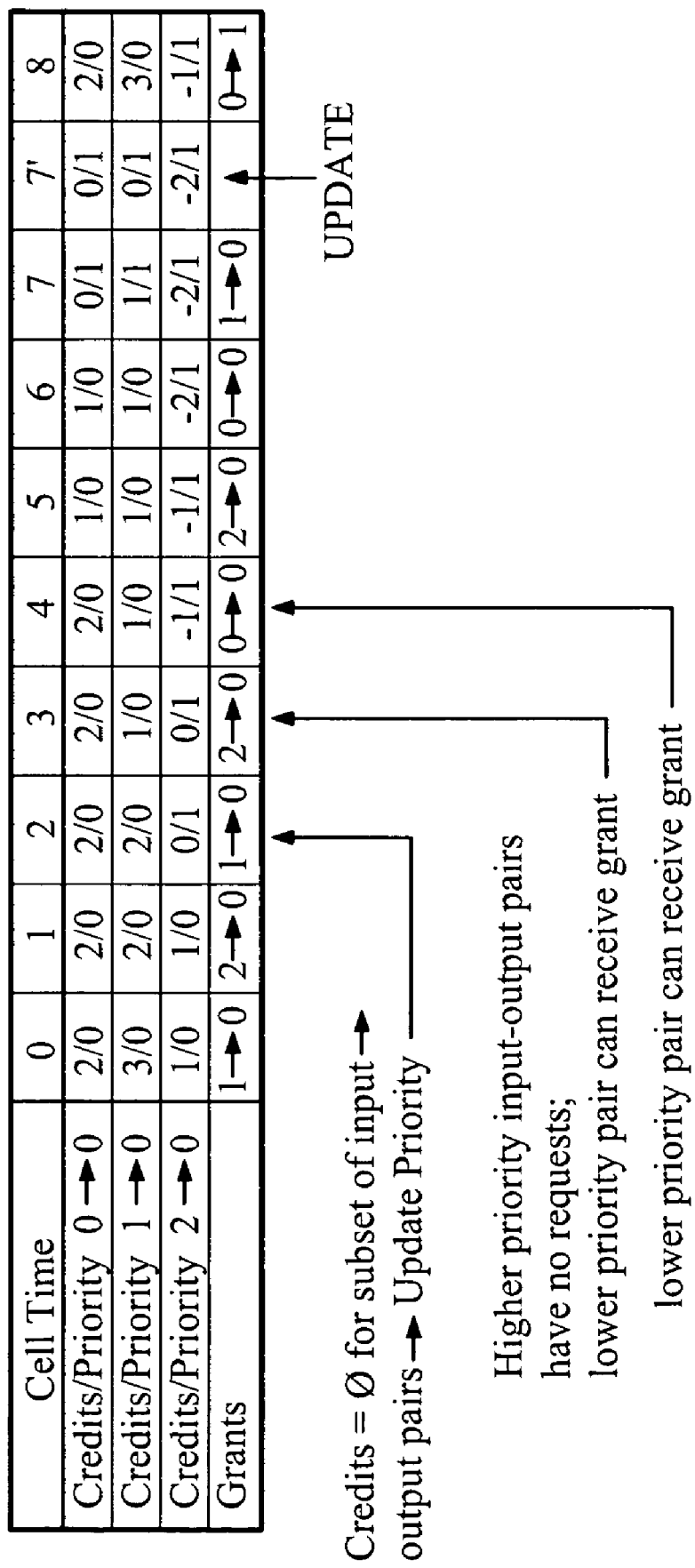
FIG. 14 is a diagram illustrating an embodiment for determining which requests of FIG. 11 are passed to a scheduler according to the weights FIG. 12.

FIG. 14 is an illustration of a work conserving embodiment WRR allocation that decreases the likelihood of unused grants occurring. In one embodiment, any two of the available strict priorities are used. In the example below, priorities 0 and 1 are used, but any other two priorities could be used. As before, information from FIGS. 11 and 12 applies to the following example of work conserving WRR. The table in FIG. 14 is similar to the table in FIG. 13, however, the row entries for each flow show both a credit number and a priority number as "credit/priority". Commencing with the example (as before, all active flows have pending requests), at cell time 0, the flow 0→0 has 2 credits, the flow 1→0 has 3 credits, and the flow 2→0 has 1 credit. All of the flows initially request at priority 0. Up to cell time 2, credits are decremented in the previously described manner for flows that received a grant in the previous cell time. At cell time 2, the flow 2→0 has its credits decremented to 0 to reflect a grant from cell time 1. In addition, the flow 2→0 must request at priority 1. Requests the flow 2→0 will now be considered, even though its credits are less than 1, if flows with a greater priority have pending requests. This is shown in cell times 3 and 5. In cell time 3, there is a grant to the flow 2→0. The flow 2→0 was able get a grant at priority 1 (the lower priority) the arbiter even though it had no credits. This indicates that other flows with nonzero credits and requesting at priority 0 (the higher priority) did not get granted. In cell time 4, the credit count for the flow 2→0 is decremented to −1, and the flow 2→0 continues to be able to have its requests passed to the arbiter if all flows with higher priorities have been considered first. At cell time 5, the flow 0→0 has its credits decremented by 1 to reflect the grant in cell time 4. In cell time 6, the flow 2→0 has its credits decremented to −2 to reflect the grant in cell time 5. In cell time 7, the flow 0→0 has 0 credits after the grant in cell time 6.

As in the FIG. 13 example, "cell time" 7' is used to designate an update of credit assignments that occurs concurrent with the changes shown in cell time 8. At "cell time" 7', the flow 1→0 has 0 credits after the grant in cell time 7, and flows have credits greater than 0. Because no flow has credits greater than 0, the original, respective numbers credits are added to the current credit count for each flow in cell time 8. The flows 0→0 and 1→0 each had 0 credits, and therefore receive their original credit counts. Also, because their credits counts are each positive after the addition, their priorities are updated to the higher priority, priority 0. The flow 2→0 has a negative credit count of −1 after the addition of its original credit count. The flow 2→0 therefore must still request at the lower priority, priority 1.

This is an example of one embodiment in which all credits and priorities are updated when all flows have credits ≦0. Many variations are possible. For example, in other embodiments, all of the flows may have credits less than 0 but no less than some maximum negative number. In other embodiments, there is an absolute saturation value such that, if any flow has credits equal to the saturation value, that flow cannot request at any priority. Any combinations of aspects of the various methods of initializing credits and priorities, debiting credits and priorities and resetting our updating credits and priorities are all possible, as are other variations not explicitly described. The goal of various credit schemes is typically used to achieve maximum throughput with the desired bandwidth allocation. The WRR embodiments described facilitate long-term weighted fair share allocation of bandwidth, without degrading short-term throughput.

Figure 15:
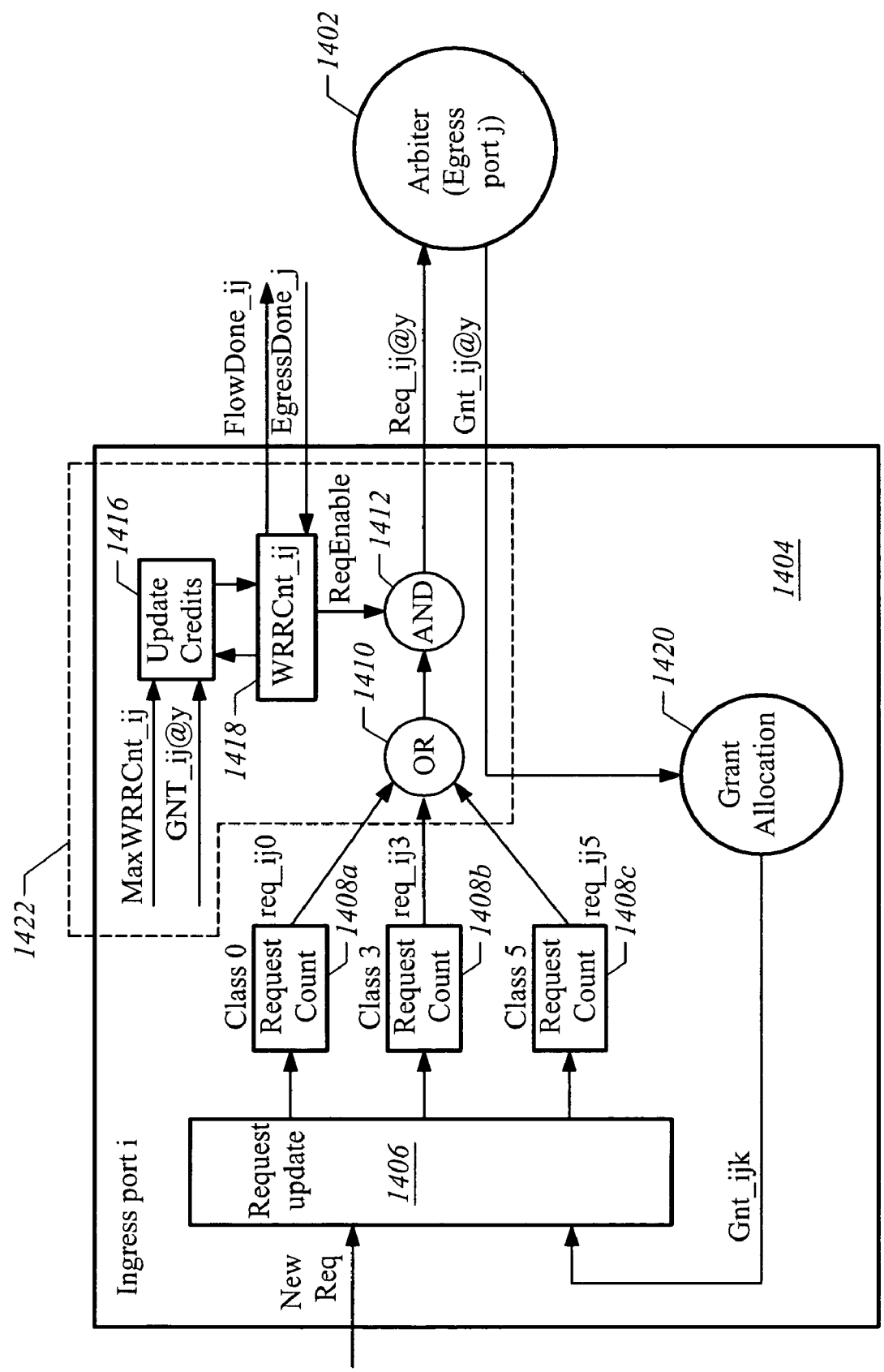
FIG. 15 is a block diagram of an embodiment of output port bandwidth allocation apparatus.
Figure 16:
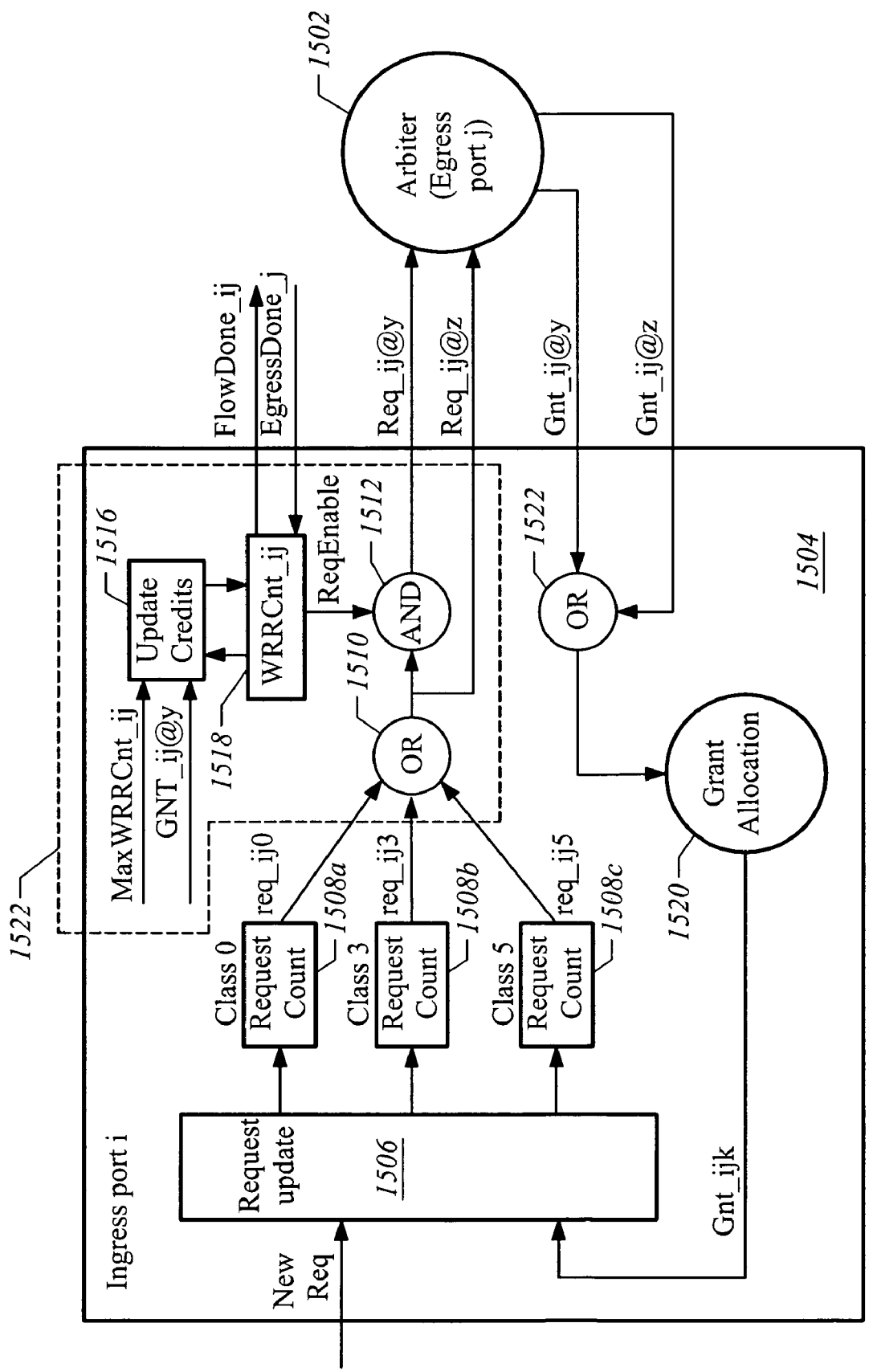
FIG. 16 is a block diagram of an embodiment of output port bandwidth allocation apparatus.

FIGS. 15 and 16 are block diagrams of exemplary embodiments of circuitry to implement non-work conserving and work conserving WRR, respectively. FIGS. 15 and 16 are embodiments of ingress ports, but other embodiments of the invention include other network components, such as traffic manager. FIG. 15 is an embodiment of an ingress port 1404 that implements a non-work conserving WRR scheme. The ingress port 1404 is labeled ingress port i and is one of multiple ingress ports belonging the set (i=0–N−1). The ingress ports i communicate with the arbiter 1402 for access one multiple egress ports j. The egress ports belong to the set egress ports j=0–N–1). Only one priority, referred to as priority y, of a strict priority scheme is used. Any number of participating classes, k, can be mapped to this single priority. For example, in ingress port 1404, classes 0, 3, and 5 are mapped to priority y.

In a request phase, at the ingress port i, all the participating requests Req_ijk, are ORed together by OR gate 1410 as Req_ij and sent to the AND gate 1412 at priority y. In our example, Req_ij0, Req_ij3, and Req_ij5 (at classes 0, 3, and 5) are ORed together to form Req_ij.

The ingress port i includes request update circuitry 1406 for receiving new requests for egress ports and for receiving grant signals Gnt_ijk. A grant Gnt_ijk is a grant from an egress j an ingress port i at class k.

Request processing circuitry 1422 includes credit update circuitry 1416, credit counter 1418, OR gate 1410, and AND gate 1412. Credit update circuitry 1416 is initially loaded with MaxWRRCnt_ij, which is the credit count corresponding to the bandwidth allocation by egress port j ingress port i. Credit counter 1418 asserts the ReqEnable signal when there are non-zero credits for a request. Req_ij proceeds to the arbiter at priority y ("Req_ij@y") if the ReqEnable is asserted AND the Req_ij signal is asserted. WRR allocation is thus applied by the request processing circuitry 1422 across ingress port i.

Credit counter 1418 decrements WRRCnt_ij on receiving a grant, Gnt_ij@y. When the available credits for Req_ij go to zero (i.e., WRRCnt_ij==0) the ingress port i stops requesting egress port j until all Req_ij get their fair weighted share (i.e., WRRCnt_ij==0 all i). EgressDone_j is asserted by egress port j when all WRRCnt_ij for egress port j have reached zero. Once EgressDone_j is asserted, the credit update circuitry 1416 receives MaxCnt_ij, WRRCnt_ij==MaxCnt_ij, and the process repeats.

Care needs to be taken to ensure that bandwidth sharing happens between only the active flows (i.e. flows with non-zero Req_ij). One embodiment forces WRRCnt_ij to zero for inactive flows. Another embodiment regulates the updating process where WRRCnt_ij is updated for active flows. This also helps to ensure that traffic flows in a non-bursty manner.

WRR allocation is further applied at a flow level across classes by the ingress port. Once ingress port 1404 gets a grant, Gnt_ij@y, it assigns it to a flow in a weighted fair shared manner. WRR flow f_ijk (not shown) is a WRR flow ingress port i to egress port j at class k. That is, the WRR scheme can be applied across classes k in a manner similar to the application the WRR scheme across ingress ports i. Again, this is done based on relative credits MaxWRRCnt_ijk (over k) assigned to a flow f_ijk. This is done using grant allocation circuitry 1420. In one embodiment, grant allocation circuitry 1420 is similar to update credit circuitry 1416 and credit count circuitry 1418. In other embodiments, the grant allocation circuitry 1420 is table-based.

In one embodiment a table-base approach, tables Tbl_ij (not shown) at ingress port i are loaded with entries corresponding to participating class numbers. The tables are loaded in proportion to MaxWRRCnt_ijk. This is done by software, based on an initial calculation of MaxWRRCnt_ijk. For example, consider 8 of strict priorities, and a 4:2:1 allocation of egress port j bandwidth among classes 0,3, and 5. A table Tbl_ij has 8 entries which class 0 gets four (MaxWRRCnt_ij0=4) entries, class 3 gets two entries (MaxWRRCnt_ij3=2), and class 5 gets one entry (MaxWRRCnt_ij5=1). One entry is left unused. The table pointers are initially reset to the beginning of tables. Pointer Ptr_ij increments on receipt Gnt_ij at priority y. On receipt of Gnt_ij the grant is allocated to flow f_ijk where k is the value that Ptr_ij was pointing to. A table entry that has no requests is skipped over in this process.

In the example of FIG. 15, the ingress port i stops requesting an egress port (i.e., Req_ij=0) at priority y when its credits go to zero (i.e., WRRCnt_ij=0) and EgressDone_j is not asserted. Because the requests are gated (disabled) before being sent to the strict priority scheduling core, the arbiter does not have complete information about the request matrix. This could lead to non-work conserving scheduling, which may result in reduced throughput. Fortunately, the multiple strict priorities provided by the strict priority scheduler can be used to alleviate this potentially reduced throughput.

FIG. 16 is an embodiment of an ingress port 1504 that implements a work conserving WRR scheme. The ingress port 1504 is labeled ingress port i and is one of multiple ingress ports i that communicate with the arbiter 1502 for access to one of multiple egress ports j. Two strict priorities, referred to as priorities y and z, are used. Priority y is higher than priority z. Any number of participating classes can be mapped to these two priorities. The request update circuitry 1506, the request count circuitry 1508, and grant allocation circuitry 1520 operate similarly to their counterparts in the embodiment of FIG. 15. However, in the request processing circuitry 1522, the credit counter 1518 allows the WRRCnt_ij to decrement below zero. In one embodiment, WRRCnt_ij is allowed to decrement to a saturation value, SatWRRCnt_ij (not shown). For example, SatWRRCnt_ij can be the maximum negative value of a signed number counter. Req_ij0, Req_ij3, and Req_ij5, are ORed in OR gate 1510 to produce Req_ij.

In a request phase, at the ingress port i, Req_ij is asserted at priority y if there are positive credits available (i.e., WRRCnt_ij>0). Req_ij is asserted at priority z if there are non-positive credits available (i.e., WRRCnt_ij≦0), and the saturation value has not been reached (i.e., WRRCnt_ij>SatWRRCnt_ij). ReqEnable is thus asserted by the credit counter 1518 when WRRCnt_ij>SatWRRCnt_ij. When WRRCnt_ij=SatWRRCnt_ij, the credit counter 1518 deasserts ReqEnable, and the ingress port 1504 stops requesting to egress j. This disabling of requests can be made programmable. In one embodiment, the credit update circuitry 1516 receives updates WRRCnt_ij to increment by Max\VRRCnt_ij when all credit counts become non-positive all participating flows egress port j (i.e., WRRCnt_ij≦0 all i).

In the short term, this scheme allows flows to get more of their intended fair share of bandwidth, as long as flows not getting their fair share are getting priority. In the long term, allocation of bandwidth is done in a weighted fair share manner. At any point in time, a flow may have received a surplus of at most SatWRRCnt_ij grants. This may result in a scheduler that is slightly unfair in the short term, but with the unfairness becoming negligible over time.

Although the invention has been described with reference to specific exemplary embodiments thereof, it will be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for scheduling multiple units of data requesting access to multiple ports in a network, the method comprising:

generating a request matrix that represents requests from particular units of data for particular ports;

generating a shuffle control that indicates a particular rearrangement of request matrix elements;
generating a shuffled request matrix, including;
rearranging, according to the shuffle control, a set request matrix elements selected from a group comprising request matrix rows and request matrix columns; and
rearranging, according to a reversed shuffle control, a set of matrix elements comprising a member of the group that was not selected to be rearranged according to the shuffle control;
performing arbitration on the shuffled request matrix to generate a shuffled grant matrix that represents shuffled granted requests; and
generating a grant matrix, including applying a de-shuffle control to shuffled grant matrix elements including rows and columns.

2. The method of claim 1, wherein the multiple units of data are cells and the ports are egress ports of a packet switch, and wherein the method further comprises using the de-shuffled grant matrix to schedule a crossbar in the packet switch to perform cell transfers for one cell time.

3. The method of claim 2, wherein the rearranging according to the reversed shuffle control occurs at alternate cell times.

4. The method of claim 3, wherein at cell times during which the rearrangement according to the reversed shuffle control does not occur, the request matrix rows and columns are each rearranged according to the shuffle control.

5. The method of claim 1, wherein the shuffle control comprises a reassignment of positions among respective matrix elements, wherein the matrix elements include rows and columns, and wherein the reversed shuffle control indicates a reassignment of positions among the respective matrix elements that is the reverse of the shuffle control reassignment.

6. The method of claim 5, further comprising generating the shuffle control using software, including:
performing a random permute function to generate shuffle controls;
storing the shuffle controls in a random access memory ("RAM"); and
accessing the generated shuffle controls in sequence to generate shuffled request matrices.

7. The method of claim 5, further comprising generating the shuffle controls using at least one pseudo-random number generator.

8. The method of claim 5, further comprising deterministically generating the shuffle controls.

9. The method of claim 1, wherein the performing arbitration is performed by a wrapped wavefront arbiter ("WWFA").

10. A switch fabric, comprising:
a plurality of ingress ports;
a plurality of egress ports;
a crossbar selectively configurable to couple ingress ports to egress ports;
a scheduler coupled to the ingress ports, the egress ports, and the crossbar, the scheduler comprising,
a shuffle component that receives a shuffle control value that indicates a particular rearrangement of request matrix elements, wherein a request matrix represents requests from particular ingress ports for particular egress ports, and wherein the shuffle control component generates a shuffled request matrix, including,
rearranging, according to the shuffle control value, a set of request matrix elements selected from a group comprising request matrix rows and request matrix columns; and
rearranging, according to a reversed shuffle control value, a set of matrix elements comprising a member of the group that was not selected to be rearranged according to the shuffle control value;
performing arbitration on the shuffled request matrix to generate a shuffled grant matrix that represents shuffled granted requests; and
a de-shuffle component that generates a grant matrix, including applying a de-shuffle control value to shuffled grant matrix elements including rows and columns; wherein the grant matrix is used to configure the crossbar.

11. The switch fabric of claim 10, further comprising a shuffle/de-shuffle control component coupled to the shuffle component and to the de-shuffle component, wherein the shuffle/de-shuffle control component generates control signals under software direction from a central processing unit interface to configure the crossbar to perform data cell transfers from the plurality of ingress ports to the plurality of egress ports once each cell time.

12. The switch fabric of claim 11, wherein the rearranging according to the reversed shuffle control value occurs at alternate cell times.

13. The switch fabric of claim 12, wherein at cell times during which the rearrangement according to the reversed shuffle control value does not occur, the request matrix rows and columns are each rearranged according to the shuffle control value.

14. A method for scheduling data through a network component in a network that uses a strict priority scheme, the method comprising:
allocating egress port bandwidth for each of a plurality of component egress ports to various component ingress ports in a weighted round robin manner, wherein the allocation includes assigning credits to each of the various ingress ports in proportion to a bandwidth allocation for an egress port;
determining which pending requests from ingress ports for egress ports will be passed to a crossbar scheduler, wherein the determination depends on a current number of credits assigned to an ingress port and a current strict priority assigned to the ingress port;
passing requests to the crossbar scheduler in the form of a request matrix;
operating on the request matrix, including,
generating a shuffled request matrix using the crossbar scheduler, including;
rearranging, according to a shuffle control value, a set of request matrix elements selected from a group comprising request matrix rows and request matrix columns; and
rearranging, according to a reversed shuffle control value, a set of matrix elements comprising a member of the group that was not selected to be rearranged according to the shuffle control value;
performing arbitration on the shuffled request matrix using to generate a shuffled grant matrix that represents shuffled granted requests;
generating a grant matrix, including applying a de-shuffle control value to shuffled grant matrix elements including rows and columns; and
using the grant matrix to configure the crossbar.

15. The method of claim 14, wherein allocation occurs at at least two levels, including:
a first level at which bandwidth is allocated among the ingress ports by a single egress port;

a second level at which bandwidth is allocated among multiple flows within each of the ingress ports, wherein a flow is characterized by an ingress port, an egress port, and a data class; and a third level at which bandwidth is allocated among items selected from a group comprising at least one sub-port and at least one data sub-class.

16. The method of claim 15, wherein multiple data classes are mapped to a single strict priority.

17. The method of claim 14, wherein:

all flows are initially assigned an initial number of credits in proportion to bandwidth allocated to the flow by an egress port, and all flows are initially assigned a same strict priority; and a flow's request for an egress port is passed to the crossbar scheduler when the flow has a credit balance for the egress port that is greater than zero.

18. The method of claim 17, wherein all flows are reassigned the initial number of credits for an egress port when all flows have credit balances of zero for the egress port.

19. The method of claim 14, wherein:

all flows are initially assigned an initial number of credits in proportion to bandwidth allocated to the flow by an egress port, and all flows are initially assigned a same strict priority; and when a flow has zero credits for the egress port, the flow is assigned a different strict priority that is lower than the initially assigned strict priority such that requests from the flow for the egress port may be passed to the crossbar scheduler when no flows with higher priority have pending requests for the egress port.

20. The method of claim 19, further comprising a saturation number of credits, which is a negative number such that when a flow has the saturation number of credits for an egress port, no requests from the flow for the egress port will be passed to the crossbar scheduler.

21. The method of claim 20, wherein, when all flows have the saturation credit number for an egress port, all flows are reassigned the initial numbers of credits and the initial same strict priority.

22. The method of claim 14, wherein the rearranging according to the reversed shuffle control occurs every other time the crossbar scheduler is configured.

23. The method of claim 22, wherein when the rearrangement according to the reversed shuffle control does not occur, the request matrix rows and columns are each rearranged according to the shuffle control value.

24. The method of claim 23, wherein when the shuffle control value indicates a reassignment of positions among respective matrix elements, wherein the matrix elements include rows and columns, and wherein the reversed shuffle control value indicates a reassignment of positions among the respective matrix elements that is the reverse of the reassignment indicated by the shuffle control value.

25. A method, comprising:

generating a plurality of values, in the form of a matrix, representing a plurality of requests to transfer a plurality of data between a plurality of ingress ports and a plurality of egress ports;

generating a random series of numbers representing matrix elements selected from a group comprising matrix rows and matrix columns;

rearranging, responsive to the random series of numbers, a set of matrix elements selected from the group; and rearranging, responsive to a reverse random series of numbers, a set of matrix elements comprising a member of the group that was not selected to be rearranged responsive to the random series of numbers.

26. The method of claim 25, wherein the plurality of data are cells and the plurality of egress ports are a plurality of egress ports of a packet switch.

27. The method of claim 25, wherein the rearranging according to the reversed random series of numbers occurs at alternate cell times.

* * * * *